US008177972B2

(12) United States Patent
Grummert et al.

(10) Patent No.: US 8,177,972 B2

(45) Date of Patent: May 15, 2012

(54) ADAPTER FOR FASTENING A FILTER ELEMENT

(75) Inventors: Ulrich Grummert, Bad Sooden-Allendorf (DE); Ralf Lausch, Goettingen (DE); Paschalis Nikoloudis, Goettingen (DE); Christian Pradel, Kalefeld-Sebexen (DE); Michael Schuetzler, Rosdorf (DE)

(73) Assignee: Sartorius Stedim Biotech GmbH (DE)

( * ) Notice: Subject to any disclaimer, the term of this patent is extended or adjusted under 35 U.S.C. 154(b) by 0 days.

(21) Appl. No.: 12/999,361

(22) PCT Filed: May 27, 2009

(86) PCT No.: PCT/EP2009/003759

§ 371 (c)(1), (2), (4) Date: Dec. 16, 2010

(87) PCT Pub. No.: WO2010/000356

PCT Pub. Date: Jan. 7, 2010

(65) Prior Publication Data

US 2011/0100892 A1 May 5, 2011

(30) Foreign Application Priority Data

Jul. 3, 2008 (DE) ......................... 10 2008 031 170

(51) Int. Cl.
*B01D 27/00* (2006.01)
*B01D 27/08* (2006.01)

(52) U.S. Cl. ...................... 210/232; 210/493.2; 277/910

(58) Field of Classification Search .................. 210/232, 210/493.2; 277/910

See application file for complete search history.

(56) References Cited

U.S. PATENT DOCUMENTS 3,850,813 A * 11/1974 Pall et al. ...................... 210/232
3,865,386 A * 2/1975 Wilke ........................... 277/529
4,839,037 A * 6/1989 Bertelsen et al. ............... 210/97
5,238,717 A * 8/1993 Boylan ......................... 428/35.7
6,105,605 A * 8/2000 Helm et al. .............. 137/355.19
6,543,625 B1 4/2003 Le Roux et al.
2001/0041286 A1 11/2001 Cramer
2002/0017497 A1 2/2002 Fritze

FOREIGN PATENT DOCUMENTS

DE 33 35 938 4/1985
DE 43 25 997 9/1994
DE 44 22 842 8/1995
DE 10 2005 033 665 2/2007
DE 20 2006 014 784 3/2008
EP 1 156 538 5/2001

OTHER PUBLICATIONS

English Translation of International Preliminary Report on Patentability.

* cited by examiner

*Primary Examiner* — Thomas M Lithgow

(74) *Attorney, Agent, or Firm* — Gerald E. Hespos; Michael J. Porco

(57) ABSTRACT

An adapter is provided for fastening a filter element in a cylindrical receiving opening of a bottom part of a lower piece of a filter housing. The adapter has at least one seal arranged in a peripheral groove on the circumference of the adapter to permit fluid-tight separation of a non-filtrate chamber, which surrounds the external jacket of the filter and from which medium to be filtered can be delivered to the filter, from a filtrate chamber into which the filtrate can be introduced from the filter. The seal is connected by injection molding to a base surface of the peripheral groove and is at a distance from at least one side wall delimiting the base surface of the groove.

8 Claims, 3 Drawing Sheets

ADAPTER FOR FASTENING A FILTER ELEMENT

BACKGROUND OF THE INVENTION

1. Field of the Invention

The invention relates to an adapter for fastening a filter element in a cylindrical receiving opening of a bottom part of a lower piece of a filter housing. The adapter has at least one seal that is arranged in a peripheral groove on the circumference of the adapter in order to permit fluid-tight separation of a non-filtrate chamber, which surrounds the external jacket of the filter and from which medium to be filtered can be delivered to the filter, from a filtrate chamber into which the filtrate can be introduced from the filter.

2. Description of the Related Art

DE 33 35 938 C1 discloses a multi-part filter housing for pressure filtration of fluids, having a housing top, and having a housing bottom with a housing base which has cylindrical openings, for receiving filter candles or filter elements via the adapters thereof, and separates a non-filtrate chamber surrounding the external jacket of the filter candle from a filtrate chamber via which the filter candles are each connected to a central outlet. The filter candles have, at their lower end in the vertical direction, a fluid-tight annular end cap with a central outlet connected to the tubular adapter via which the filter candle is inserted into the cylindrical opening of the housing bottom. The filter candle is located with its fluid-permeable external jacket in the non-filtrate chamber, and the annular end cap with its upper edge directed away from the housing bottom forms a fluid-tight transition area to the external jacket. To seal the adapter in the cylindrical opening of the housing bottom, the known adapter has two parallel peripheral grooves, in each of which an O-ring is arranged as a seal.

A disadvantage that has been found in principle in the known adapter is that the O-rings or cord seals have to be mounted separately. This can mean incorrect seals being fitted, at least by the user, or one of the seals being omitted.

DE 43 25 997 A1 discloses an adapter for fastening a filter element on a liquid discharge nozzle. On its inner wall directed toward the liquid discharge nozzle, the adapter has a peripheral groove with a seal arranged therein for fluid-tight separation of a non-filtrate chamber, which surrounds the external jacket of the filter and from which medium to be filtered can be delivered to the filter after filtration. The seal is at a distance from at least one side wall delimiting the base surface of the groove.

According to the teaching of DE 43 25 997 A1, a reliable seal is provided by the liquid that is to be filtered and that flows through the liquid filter, because this liquid, as a result of the pressure difference arising when it flows through the filter insert, pushes the sealing ring inside the groove in the direction toward the part of the liquid filter with the lower liquid pressure. In this way, during operation of the liquid filter or the filter element, the sealing ring or the seal is pressed onto the liquid discharge nozzle and onto a boundary surface of the groove adjacent thereto, such that a seal is ensured here despite the low or even non-existent elastic pretensioning of the sealing ring or seal.

In the device from DE 43 25 997 A1, it is always necessary that fluid to be filtered flows through the annular gap into the groove in order to ensure that the sealing ring or the seal is pressed upward into the abutment position on the end disk part, as only then is a seal achieved.

DE 20 2006 014 784 U1 discloses an annular filter insert in which an end disk covering the end of the filter body is formed in one piece by a perforated disk and a collar arranged on the latter. The collar has an axial support surface and a radial support surface. A radial sealing ring with pockets for removal of thermal energy can be applied to these support surfaces in a two-component process or by injection molding. This radial sealing ring is only limited at the bottom by the axial support surface and at the sides by the radial support surface, whereas it is open in the filtrate outflow direction. The radial sealing ring is formed integrally on the collar of the end disk, i.e. on the inner circumference of the adapter.

The radial sealing ring is quite complicated to produce because of the hollow pockets, and defects in the radial sealing ring during production thereof can be detected optically only with difficulty, particularly if the material webs or the bottom of the hollow pockets breaks and leaks occur there as a result.

Moreover, EP 1 156 538 B1 discloses a plug arrangement for closing a cell vent of a storage battery in a gas-tight manner. A closure plug has, on its circumference, a groove with an annular seal formed integrally thereon. The annular seal was molded on in a two-component injection molding process. The groove is filled completely by the annular seal.

Moreover, DE 10 2005 033 665 A1 discloses a receiving part for a plug, which receiving part has, in an inner peripheral groove, an injection-molded seal. Here too, the groove is filled completely by the sealing material.

A disadvantage of completely filling a groove with the material of the seal is that the clearance necessary for the volume deformation has to be created outside the groove.

A particular disadvantage is that the tolerances between adapter and receiving opening have to be changed in order to create a clearance for the volume deformation.

Moreover, DE 44 22 842 C1 discloses a device with a housing having at least two individual parts fitted together with the use of elastic sealing material so as to be liquid-tight. At least one of the individual parts comprises two material components, one of which is the sealing material and provides a seal, in which at most one of these two material components is bonded as a pre-molding or insert in an injection mold with the sealing material by spraying, or both components are sprayed together in a two-component injection mold, that is to say an injection mold with two cavities.

The object of the present invention is therefore to improve the known adapter for fastening a filter element in a cylindrical receiving opening of a bottom part such that it is possible to avoid fitting the seal separately. Moreover, a change in the tolerances between adapter and receiving opening should as far as possible be avoided, in order to permit the use of new adapters and also of old and known adapters in already existing receiving openings.

SUMMARY OF THE INVENTION

The invention relates to an adapter for fastening a filter element in a cylindrical receiving opening of a bottom part of a lower piece of a filter housing. The adapter has at least one seal arranged in a peripheral groove on the circumference of the adapter to permit fluid-tight separation of a non-filtrate chamber that surrounds the external jacket of the filter and from which medium to be filtered can be delivered to the filter from a filtrate chamber into which the filtrate can be introduced from the filter. The seal is connected by injection molding to a base surface of the peripheral groove, and the seal is at a distance from at least one side wall delimiting the base surface of the groove.

By virtue of the fact that the seal is injection molded onto a base surface of the peripheral groove, it is possible to dispense with separate fitting. At the same time, it is ensured that the correct sealing ring released by the manufacturer and made of the intended material is arranged in the groove of the adapter. The distance between the seal and at least one side wall delimiting the base surface of the groove results in a space for taking up the deformation volume of the seal upon insertion into the cylindrical receiving opening of the bottom part. It is thus possible to avoid a change of tolerances between the cylindrical receiving opening and the outer shape of the adapter. This means that new filter elements with the adapter according to the invention and also old filter elements with a known adapter can be inserted into existing cylindrical openings of known filter housings or of the bottom plates thereof.

According to a preferred embodiment of the invention, the seal is arranged centrally in the groove and is at a distance from both of the side walls delimiting the base surface of the groove. This is relatively easy to do, particularly when injection molding a seal in a single groove. According to a preferred embodiment, a second seal is injection molded on the base surface in a second peripheral groove. The first and second seals are injection molded onto the base surfaces of two mutually parallel grooves, and the seals bear directly on the two mutually facing inner side walls of the grooves. The distances are filled out by suitable tool inserts during the injection molding.

It has proven particularly advantageous if the two seals are connected to each other via at least one web, preferably three or four webs, extending in the axial direction. In this way, the two interconnected seals form a particularly tight barrier between the non-filtrate chamber and the filtrate chamber of the filter housing comprising a filter element with adapter.

According to a preferred embodiment of the invention, a third seal, in a peripheral groove in the area of an end cap of the filter element, is injection molded onto the base surface of the groove. By virtue of the arrangement of the third seal in the area of the end cap of the filter element adjacent to the adapter, the filter element, including the end cap, can be inserted into a corresponding receiving opening of the bottom part, such that there is practically no dead space in the non-filtrate chamber, and all of the medium that is to be filtered and that is located in the non-filtrate chamber can be filtered through the filter and carried into the filtrate chamber.

According to a preferred embodiment of the invention, the seals are made of a thermoplastic elastomer, a thermoplastic urethane, or silicone.

According to a preferred embodiment of the invention, the adapter has a main body with an encapsulated reinforcing ring. The adapter is preferably welded to an end cap of the filter element. However, it can also be formed integrally onto the end cap.

Further features of the invention will become clear from the following detailed description and from the attached drawings in which preferred embodiments of the invention are illustrated by way of example.

DETAILED DESCRIPTION OF THE PREFERRED EMBODIMENT

Figure 1:
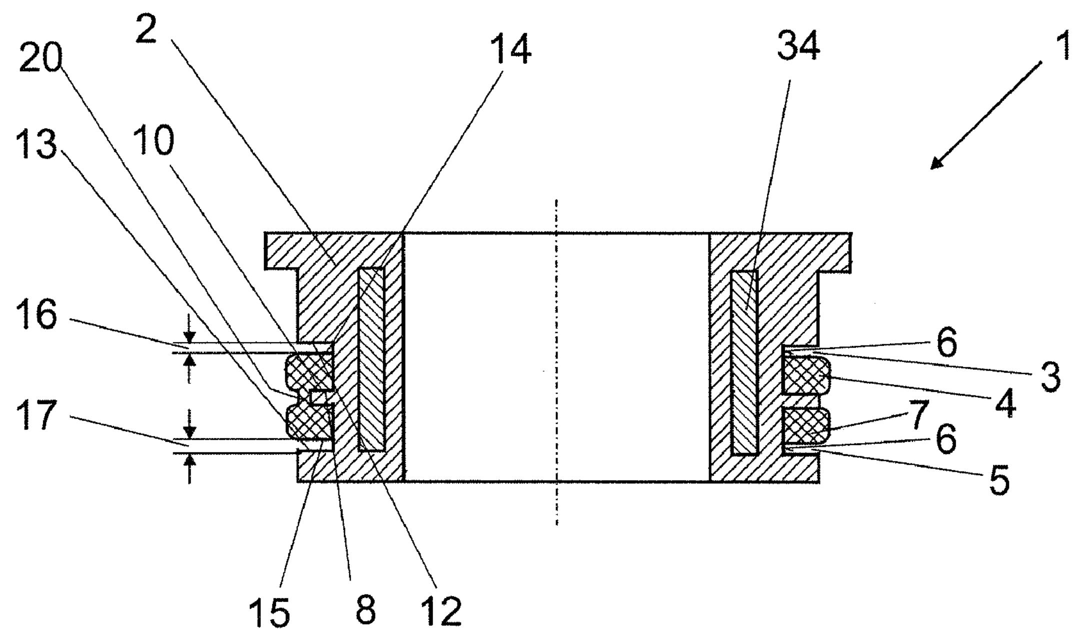
FIG. 1 shows a side view, in cross section, of an adapter with two parallel seals
Figure 2:
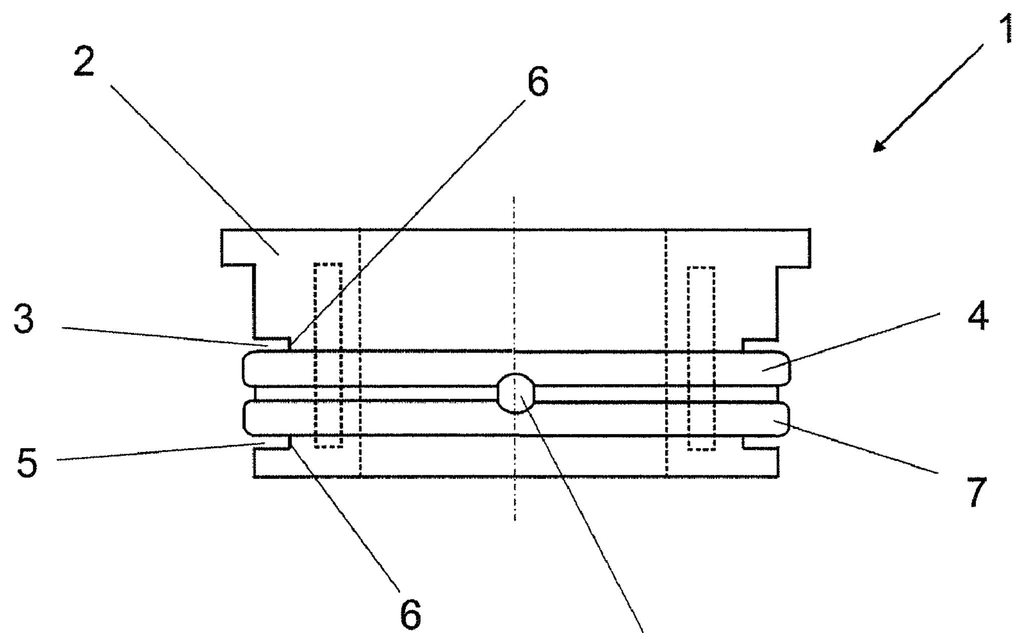
FIG. 2 shows a side view of the adapter from FIG. 1.

An adapter 1 basically comprises a main body 2, a peripheral groove 3 and a seal 4.

Parallel to the peripheral first groove 3, a peripheral second groove 5 is arranged in the main body 2 of the adapter 1. The peripheral grooves 3, 5 each have a base surface 6, the seal 4 being injection molded onto the base surface 6 in the first peripheral groove, and a second seal 7 being injection molded onto the base surface 6 in the second peripheral groove. The seals 4, 7 lie directly with their inner side surfaces 8, 9 on the adjacent inner side walls 10, 11 of the grooves 3, 5 or are connected to the side walls 10, 11 by injection molding. The outer side surfaces 14, 15, directed away from the inner side surfaces 8, 9 of the seals 4, 7, are each at a distance 16, 17 from the outer side walls 12, 13, directed away from the inner side walls 10, 11, which distance 16, 17 provides space for taking up a deformation volume of the seals 4, 7 when the adapter 1 is inserted into the cylindrical opening 18 of a bottom part 19.

The seals 4, 7 are connected to each other by webs 20. One of the webs 20 can be used as injection point 21. However, an additional web 22 with an injection point 23 can also be provided.

Figure 3:
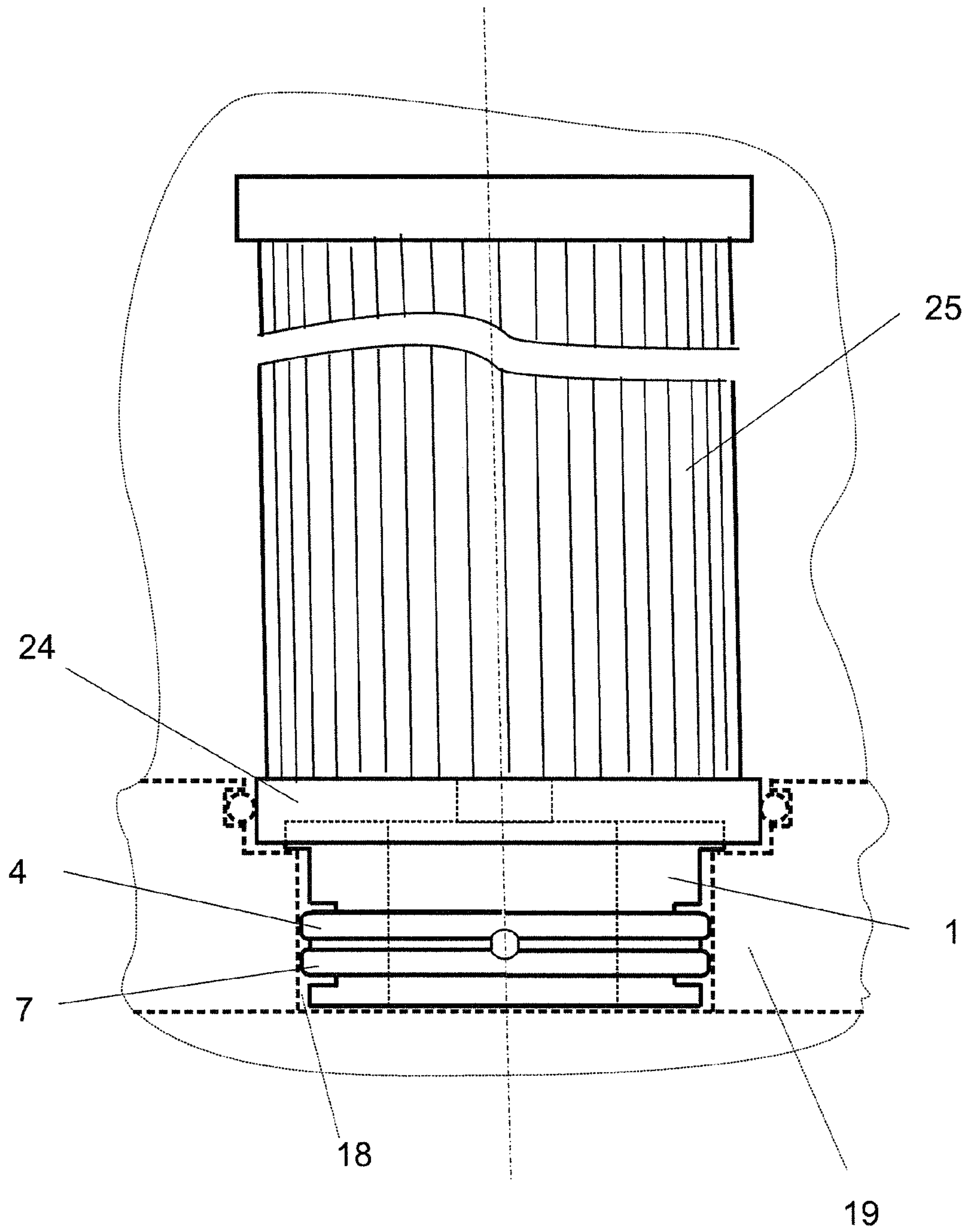
FIG. 3 shows a side view of a filter element with end cap and adapter, and with a bottom plate (indicated by broken lines) of a filter housing.

According to FIG. 3, the adapter 1 is inserted into a lower end cap 24 of a filter element 25 and welded thereto.

Figure 4:
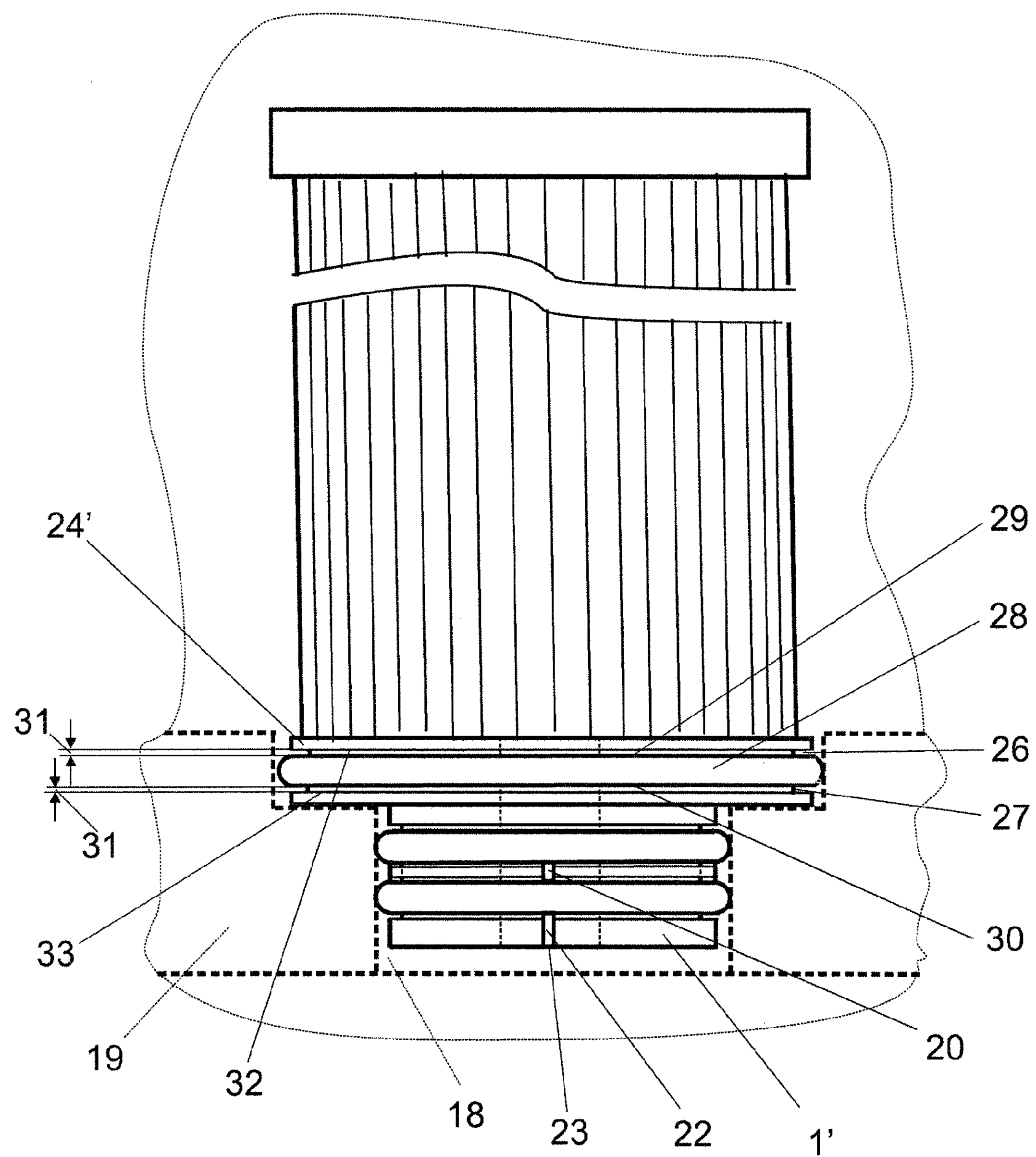
FIG. 4 shows a side view of another filter element with a third seal in a groove of the end cap of the filter element.

However, according to the illustrative embodiment shown in FIG. 4, the adapter 1' can also be formed integrally onto the lower end cap 24' of a filter element 25'.

According to the illustrative embodiment in FIG. 4, the lower end cap 24' has, on its circumference, a peripheral third groove 26, on the base surface 27 of which a third seal 28 is injection molded centrally in such a way that its side surfaces 29, are each at a distance 31 from the side walls 32, 33 of the third groove 26.

A tool (not shown) for producing an adapter 1, 1' is, for example, composed of two cavities in a stationary tool half and of a rotatable tool plate on a movable tool half. After each injection operation, the tool opens and the rotatable tool plate transports the plastic part produced in the first cavity to a position in front of the second cavity. This involves the following sequence of method steps:

a) a reinforcing ring 34 is fitted into the first cavity,
b) the tool closes,
c) the main body 2 is injected around the reinforcing ring 34 in the first cavity,
d) the tool opens,
e) the tool plate rotates, and the main body 2 is transported into the second cavity,
f) a reinforcing ring 34 is fitted into the first cavity,
g) the tool closes,
h) the main body 2 is injected around the reinforcing ring 34 in the first cavity, and the seals 4, 7 are injected onto the adapter 1 in the second cavity,
i) the tool opens,
j) the adapter 1 produced in the second cavity is removed,
k) the tool plate rotates,
a) a reinforcing ring 34 is again fitted into the first cavity,
b) the tool closes, and steps c) to k) are repeated.

Of course, the tool can also be composed of three or more cavities in the stationary tool half and of a rotatable tool plate on the movable tool half.

After each injection operation, the tool opens and the rotatable tool plate transports the plastic part produced in the first cavity to a position in front of the second cavity and transports the plastic part produced in the second cavity 2 to a position in front of the third cavity.

Of course, the embodiments discussed in the description and shown in the figures are only illustrative embodiments of the present invention. A wide range of possible variations will be evident to a person skilled in the art in light of the disclosure herein.

For example, the seals 4, 7, 28 are convex at the side directed away from the base surface 6, 27. In principle, however, they can also have other shapes.

The invention claimed is:

1. An adapter (1, 1') for fastening a filter element (25, 25') in a cylindrical receiving opening (18) of a bottom part (19) of a lower piece of a filter housing, said adapter comprising first and second parallel peripheral grooves (3, 5) on an outer circumference of the adapter (1, 1') and formed with outwardly facing base surfaces (6), a dividing wall separating the peripheral grooves (3, 5) and having oppositely facing first and second inner side surfaces (10, 11) facing into the respective first and second peripheral grooves (3, 5), first and second outer side surfaces (12, 13) formed respectively in the first and second peripheral grooves (3, 5) and facing toward the respective first and second inner side surfaces (10, 11), first and second seals (4, 7) arranged into the first and second peripheral grooves (3, 5) to permit fluid-tight separation of a non-filtrate chamber, which surrounds an external jacket of the filter and from which medium to be filtered can be delivered to the filter, from a filtrate chamber into which the filtrate can be introduced from the filter, the seals (4, 7) being injection molded onto the base surfaces (6) of the peripheral grooves (3, 5), and engaging the first and second inner side surfaces (10, 11) while being at a distance (16, 17) from the first and second outer side surfaces (12, 13) the first and second seals (4, 7) being connected to each other via at least one web (20) extending in an axial direction, the web (20) being spaced outward from the base surfaces (6) and engaging an outer circumferential surface of the dividing wall, the seals (4, 7) being unconnected to one another on opposite circumferential sides of the web (20).

2. The adapter of claim 1, characterized in that the first and second seals (4, 7) are connected to each other via two circumferentially spaced webs (20) extending in the axial direction.

3. The adapter of claim 2, further comprising a third seal (28) injection molded onto a base surface of a third peripheral groove (26) in an area of an end cap (24') of the filter element (25').

4. The adapter of claim 2, characterized in that the seal (4, 7, 28) is made of a thermoplastic elastomer, a thermoplastic urethane, or silicone.

5. The adapter of claim 1, characterized in that the adapter (1, 1') has a main body (2) with an encapsulated reinforcing ring (34).

6. The adapter of claim 1, characterized in that the adapter (1, 1') is welded to an end cap (24, 24') of the filter element (25, 25') or is formed integrally onto the end cap (24, 24').

7. The adapter of claim 1, further comprising a third seal (28) injection molded onto a base surface of a third peripheral groove (26) in the area of an end cap (24') of the filter element (25').

8. The adapter of claim 1, characterized in that the seal (4, 7, 28) is made of a thermoplastic elastomer, a thermoplastic urethane, or silicone.

* * * * *